United States Patent [19]

Sonnenberg et al.

[11] 4,056,667
[45] Nov. 1, 1977

[54] PROCESS PERMITTING A POLYMERIZATION BATCH TO BE ADDITIONALLY COOLED

[75] Inventors: Helmut Sonnenberg, Erftstadt-Lechenich; Bruno Krämer, Hurth, both of Germany

[73] Assignee: Hoechst Aktiengesellschaft, Frankfurt am Main, Germany

[21] Appl. No.: 636,934

[22] Filed: Dec. 2, 1975

[30] Foreign Application Priority Data

Dec. 7, 1974 Germany .............................. 2458024

[51] Int. Cl.² .......................... C08F 2/18; C08F 14/06
[52] U.S. Cl. ....................................... 526/74; 526/68
[58] Field of Search .................................. 526/68, 74

[56] References Cited

U.S. PATENT DOCUMENTS

| | | | |
|---|---|---|---|
| 3,350,377 | 10/1967 | Norwood | 526/74 |
| 3,578,649 | 5/1971 | Badguerahanian | 526/68 |
| 3,595,848 | 7/1971 | Reinecke et al. | 526/68 |
| 3,627,744 | 12/1971 | Hopkins et al. | 526/68 |
| 3,825,512 | 7/1974 | Reiter et al. | 526/74 |
| 3,891,603 | 6/1975 | Heil et al. | 526/329 |
| Re. 22,210 | 10/1942 | De Simo et al. | 526/74 |

*Primary Examiner*—Alan Holler
*Attorney, Agent, or Firm*—Connolly and Hutz

[57] ABSTRACT

Improved process permitting a vinyl chloride batch which is to undergo polymerization in suspension, to be additionally cooled. Gaseous matter formed in the gas chamber of a polymerization vessel is delivered through a pipe connection communicating with the gas chamber and a reflux condenser, to the reflux condenser and condensed therein, and the resulting condensate is returned to the polymerization vessel. In the improved process one or more nozzle structures are used to inject fully desalted water into the pipe connection over the entire polymerization period. The spray water has an approximate temperature of from 5° to 45° C and is used in a proportion of at least 10% by volume, based on the overall quantity of water necessary for effecting the polymerization.

4 Claims, 1 Drawing Figure

U.S. Patent  Nov. 1, 1977  4,056,667
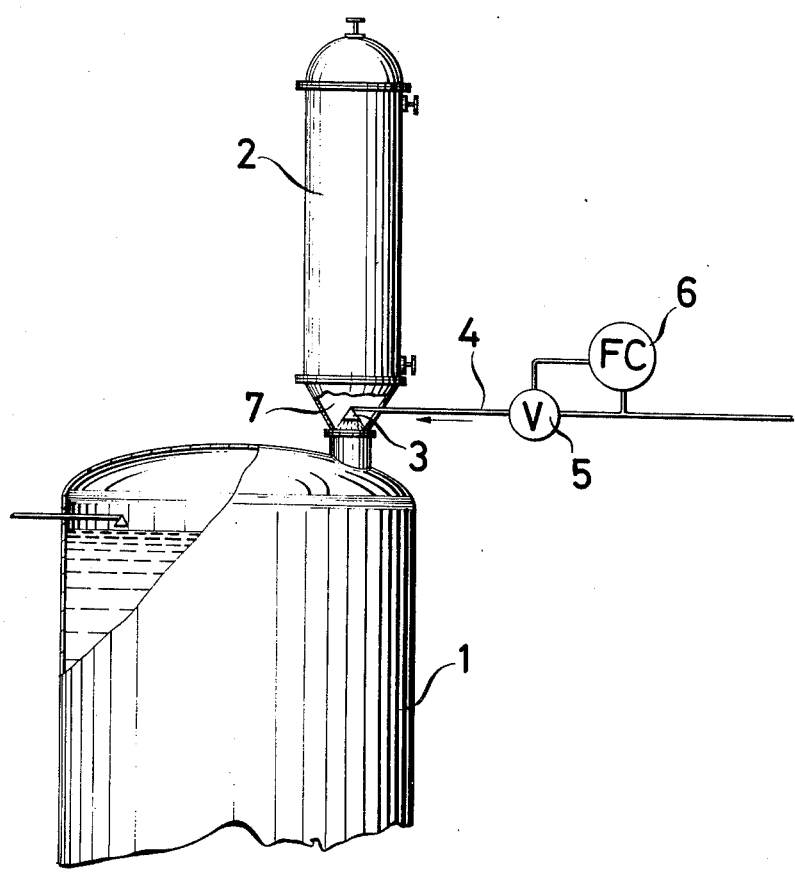

PROCESS PERMITTING A POLYMERIZATION BATCH TO BE ADDITIONALLY COOLED

The present invention relates to a process permitting a polymerization batch, such as that used for the polymerization of vinyl chloride in suspension, to be additionally cooled.

The discontinuous polymerization of vinyl chloride in suspension is an exothermal reaction. A factor which critically influences commercial operation is the intensity with which heat set free during the polymerization can be dissipated. In prior art processes the polymerization heat is dissipated by cooling the jacket surrounding the polymerization vessel. As it is normally necessary for the polymerization to be effected at temperatures, which are as constant as possible, it is clear that the polymerization velocity depends primarily on the heat transfer conditions prevailing in the polymerization vessel. While it would be desirable to shorten the polymerization period, the fact remains that the abstraction of heat by jacket-cooling enables this to be achieved within very narrow limits only. This is more especially of a problematic nature in commercial reactors, e.g. those having a capacity of 100,000 liters and more. In other words, the art is in need of a process permitting the abstraction of heat to be improved in order to make it possible for the polymerization period to be shortened, and for the commercial reactors to be operated under reasonable conditions.

Attempts have already been made to achieve this by vapor cooling. To this end, a proportion or the entire reaction heat is dissipated by means of a reflux condenser, which is disposed upstream of the polymerization vessel. The heat transfer agent is the monomer which is vaporized in the reaction chamber. The resulting vaporous matter is condensed in the reflux condenser and the condensate is returned to the reaction chamber.

The use of a reflux condenser in the production of polyvinyl chloride is technically good practice only if such use is combined with steps which definitely permit the condenser's inner surface areas to be kept free from depositing polyvinyl chloride. In the absence of such steps the condenser is rendered completely useless by depositing polymer. Experience has shown this to occur even after one operating cycle or two. It is then naturally necessary for the condenser to be subjected to an extremely time-consuming and expensive cleaning treatment.

German Published Specification "Offenlegungsschrift" No. 2,305,211 describes the polymerization of vinyl chloride in aqueous medium, wherein the reaction heat is dissipated by means of a reflux condenser and wherein fully desalted water is sprayed on to the condenser's inner surface areas in an attempt to prevent polymeric matter from depositing thereon. A preferred feature of that process provides for the vinyl chloride in vapor form, which travels upwardly in the gas chamber of the polymerization vessel to the reflux condenser, to be contacted, before it reaches the reflux condenser, with a spray liquid containing a defoaming agent.

A disadvantage of this process resides in the fact that the quantity of fully desalted water in the polymerization vessel is increased by about 20 to 45% by volume during the polymerization, and that it is necessary for the entire quantity of water, which travels through the reflux condenser, to be maintained under a pressure higher than that which prevails in the reactor. More especially, the pressure inside the reactor is as high as 8.7 bar e.g. at 50° C, and even 9.7 bar at 60° C, corresponding to the vapor pressure of vinyl chloride. This is of a problematic nature especially with respect to the operation of large commercial reactors or a series of smaller reactors in parallel arrangement. With regard to the suspension polymerization of vinyl chloride, it has already been suggested that the bulk of water necessary for preparing the polymerization batch be introduced at atmospheric pressure into the reactor and that the quantity of make-up water, which is added later during the polymerization, be minimized for energetic reasons.

A further disadvantage of the process described in German Published Specification "Offenlegungsschrift" No. 2,305,211 is seen to reside in the addition of a liquid containing a defoaming agent which may adversely affect the polymer's properties.

It is accordingly an object of the present invention to provide means for polymerizing a vinyl chloride polymerization batch in suspension with reflux-cooling, which permit the reflux condenser's inner surface areas to be kept free from depositing material, and permit the adverse effects entailed by the process described in German Published Specification "Offenlegungsschrift" No. 2,305,211 to be avoided.

The present invention relates more particularly to a process permitting a vinyl chloride batch which is to undergo polymerization in suspension to be additionally cooled, wherein gaseous matter formed in the gas chamber of a polymerization vessel is delivered through a pipe connection communicating with the gas chamber and reflux condenser, to the reflux condenser and condensed therein, and the resulting condensate is returned to the polymerization vessel, which process comprises spraying by means of one or more nozzle structures fully desalted water into the pipe connection over the entire polymerization period, the water sprayed into the pipe connection having an approximate temperature of from 5° C to 45° C and being used in a proportion of at least 10% by volume, preferably 10 to 15% by volume, based on the overall quantity of water necessary for effecting the polymerization.

A preferred feature of the present process provides for the water which is sprayed into the pipe connection to have a temperature ranging from 10° to 30° C. The water should conveniently be sprayed into the pipe connection so as to produce a spray cone covering the entire cross-sectional flow area in the pipe connection, the water flowing counter-currently with respect to the gases travelling upwardly therein to the reflux condenser. The quantity of water injected per unit time during the entire polymerization period should preferably be kept as constant as possible.

The process of the present invention may be carried out, for example, in the exemplary form of apparatus shown diagrammatically in the accompanying drawing.

With reference to the drawing:

The apparatus substantially comprises a polymerization vessel 1, a reflux condenser 2, a supply pipe 4 for desalted water, a regulating valve 5 and a quantity recording device 6, the valve 5 and the device 6 being housed within the pipe 4, and a pipe connection 7. The reflux condenser 2 is mounted on the properly dimensioned pipe connection 7 through which vinyl chloride in vapor form is delivered to the condenser 2 and condensed therein, and resulting condensed and liquid vinyl chloride is returned to the polymerization vessel 1.

Nozzle structure 3 is used to inject fully desalted water into the conical pipe connection 7 disposed between the polymerization vessel 1 and the reflux condenser 2, the water being injected so as to flow counter-currently to the vaporous vinyl chloride travelling upwardly through pipe connection 7. The nozzle structure 3 enables even a minimum quantity of water to be sprayed in the form of a cone just large enough to reach across the entire cross-sectional area of pipe connection 7. Housed within the line 4 for fully desalted spray water are a regulating valve 5 and a quantity recording device 6 as safety devices which respond to pressure variations in the polymerization vessel, if any. The quantity recording device is operatively coupled with the regulating valve 5 so as to ensure the supply of nozzle 3 with the constant quantity of water necessary to produce a spray cone, independently of the pressure prevailing inside the polymerization vessel 1.

An apparatus such as that shown in the accompanying drawing has been tested under commercial conditions in connection with a polymerization vessel of 25,000 liter capacity and provided with a reflux condenser having a heat exchanger surface of 33 m². Fully desalted water was injected in each particular case over the entire polymerization period including the heating-up period prior to the start-up of the polymerization and the cooling period after the end of the polymerization. Depending on the polymerization period in each particular case, the quantity of water injected was between 10 and 15% by volume, based on the overall quantity of fully desalted water used. The performance of the reflux condenser could not be found to have been reduced, aven after more than 40 polymerization cycles. After each cycle, the condenser was inspected. Polymeric material could not be found to have been deposited on the condenser's inner surface areas. The apparatus of the present invention shown diagrammatically in the accompanying drawing also worked reliably in those cases in which the treatment of the polymerization batch was accompanied by strong and prolonged foaming, which was signalled by a suitable measuring device.

The process of the present invention enables the inner surface areas of a reflux condenser to be kept free from depositing polymer with the use of considerably less water than heretofore and therefore compares favorably with the prior art methods. More particularly, the water is introduced into the reactor at a place making it substantially impossible for foam bubbles to penetrate into the reflux condenser without any need to use the spray water in admixtures with an emulsifier as usual. Still further, the present process remains fully operable if the condenser is re-introduced into the polymerization vessel through an opening other than the gas outlet running from the polymerization vessel to the reflux condenser.

EXAMPLE 1

Polyvinyl chloride was made by suspension polymerization. To this end, a polymerization vessel having a capacity of 25,000 liter was supplied with 10,800 liter of fully desalted water, 6,800 liter of vinyl chloride, 7.5 kg of partially saponified polyvinyl acetate containing 20% of ester, 0.8 kg of di-isopropyl percarbonate and 2.0 kg of tertiary butyl perpivalate. Mounted on the polymerization vessel was a tabular reflux condenser with altogether 121 cooling tubes 2500 mm long and 33 mm wide. The heat transfer area of the condenser was 33.8 m². The polymerization batch was heated to 63° C within 1 hour and the polymerization was initiated. While this was done, 200 l/h of fully desalted water having a temperature of 25° C was injected in the form of a fine spray into the pipe connection provided between the polymerization vessel and the reflux condenser. During the entire polymerization period of 10 hours, about 60,000 kcal/h of heat was dissipated by means of the reflux condenser and 2,000 l of water was introduced into the pipe connection. At the end of the polymerization reaction, the polymerization vessel was found to contain 12,800 l of water of which 15% by volume was spray water. The quantity of spray water used enabled the condenser's inner surface areas to be completely kept free from depositing polymer.

EXAMPLE 2

The procedure was as described in Example 1 but the polymerization vessel was supplied with 8,800 liter of vinyl chloride, 11,800 liter of fully desalted water, 1.5 kg of partially saponified polyvinyl acetate, 2.0 kg of methyl hydroxypropyl cellulose, 0.5 kg of di-isopropyl percarbonate, and 2.3 kg of tertiary butyl perpivalate. The polymerization batch was heated to 57° C and, while this was done, 200 l/h of fully desalted water was injected into the pipe connection provided between the condenser and reactor. The polymerization was terminated after 7 hours. Altogether 150,000 kcal/h of heat was dissipated by means of the reflux condenser. During the entire polymerization period 1,400 l of water was injected into the polymerization vessel which contained 13,200 liter of water at the end of the polymerization reaction. The quantity of spray water was 10% by volume, based on the overall quantity of water.

The apparatus described in Example 1 was used for the suspension polymerization in accordance with the present process of altogether 43 polymerization batches. The performance of the condenser could not be found to have been reduced. Two further polymerization batches were polymerized for the purpose of comparison in the manner described in Example 2, but no water was injected. After polymerization of the second batch, polymeric material was found to have been deposited on the inner surface areas of the individual cooling tubes. As a result the reflux condenser was completely useless.

We claim:

1. In a process permitting a vinyl chloride batch which is to undergo polymerization in suspension, with the use of an overall quantity of water necessary for effecting the polymerization to be additionally cooled, wherein gaseous matter formed in the gas chamber of a polmerization vessel is delivered through a pipe connection communicating with the gas chamber and a reflux condenser, to the reflux condenser and condensed therein, and the resulting condensate is returned to the polymerization vessel, the improvement which comprises spraying by means of at least one nozzle structure, a liquid consisting essentially of fully desalted water into the pipe connection substantially across its entire cross section and over the entire polymerization period, the water sprayed into the pipe connection having an approximate temperature of from 5° to 45° C and being used in a proportion ranging from about 10 to 15% by volume, based on overall quantity of water necessary for effecting the polymerization whereby the formation of undesirable polymer deposits in the condenser is prevented.

2. The process as claimed in claim 1, wherein the spray water has a temperature ranging from 10° to 30° C.

3. The process as claimed in claim 1, wherein the water is injected into the pipe connection so as to produce a spray cone covering the entire cross-sectional flow area in the pipe connection, the water flowing countercurrently to the gases travelling upwardly therein.

4. The process as claimed in claim 1, wherein the quantity of water injected per unit time is kept constant during the entire polymerization period.

* * * * *